US012354575B2

(12) United States Patent
Kajikawa et al.

(10) Patent No.: US 12,354,575 B2
(45) Date of Patent: Jul. 8, 2025

(54) INDICATOR DEVICE, ELECTRONIC MUSICAL INSTRUMENT, LIGHT EMISSION CONTROL METHOD AND STORAGE MEDIUM

(71) Applicant: CASIO COMPUTER CO., LTD., Tokyo (JP)

(72) Inventors: Tomoya Kajikawa, Tokyo (JP); Shingo Okano, Akiruno (JP); Osamu Moriyama, Ome (JP); Ken Terao, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 250 days.

(21) Appl. No.: 18/207,200

(22) Filed: Jun. 8, 2023

(65) Prior Publication Data

US 2023/0419928 A1 Dec. 28, 2023

(30) Foreign Application Priority Data

Jun. 22, 2022 (JP) ................................ 2022-100094

(51) Int. Cl.
*G10H 1/00* (2006.01)
*G10H 1/34* (2006.01)

(52) U.S. Cl.
CPC ............ *G10H 1/0008* (2013.01); *G10H 1/34* (2013.01); *G10H 2220/061* (2013.01); *G10H 2230/065* (2013.01)

(58) Field of Classification Search
CPC .. G10H 1/0008; G10H 1/34; G10H 2220/061; G10H 2230/065
See application file for complete search history.

(56) References Cited

U.S. PATENT DOCUMENTS

| | | | | |
|---|---|---|---|---|
| 4,908,868 A * | 3/1990 | McTaggart | ............. | H04R 29/00 381/59 |
| 7,674,964 B2 * | 3/2010 | Ohmura | ............... | G10H 1/0008 84/478 |
| 11,864,311 B1 * | 1/2024 | Cromarty | ............. | H05K 1/0268 |
| 2023/0419928 A1 * | 12/2023 | Kajikawa | ............. | G10H 1/0008 |

FOREIGN PATENT DOCUMENTS

| | | |
|---|---|---|
| JP | H03121491 A | 5/1991 |
| JP | 2004029720 A | 1/2004 |
| JP | 2006276333 A | 10/2006 |
| JP | 2008225005 A | 9/2008 |

* cited by examiner

*Primary Examiner* — Robert W Horn
(74) *Attorney, Agent, or Firm* — Holtz, Holtz & Volek PC

(57) ABSTRACT

An indicator device includes a plurality of light emitters and at least one processor. The processor obtains, at intervals of a first period, a first period maximum value representing a maximum volume among a plurality of pieces of volume information based on an input signal. The processor obtains, for each second period including a plurality of first periods each being the first period, a minimum value among first period maximum values each being the first period maximum value as a second period minimum value and a maximum value among the first period maximum values as a second period maximum value. The processor controls light emission of the light emitters based on a relative ratio of a predetermined first period maximum value among the first period maximum values. The relative ratio is based on the second period minimum value and the second period maximum value.

20 Claims, 3 Drawing Sheets

INDICATOR DEVICE, ELECTRONIC MUSICAL INSTRUMENT, LIGHT EMISSION CONTROL METHOD AND STORAGE MEDIUM

REFERENCE TO RELATED APPLICATIONS

This application is based upon and claims the benefit of priority from the prior Japanese Patent Application No. 2022-100094, filed on Jun. 22, 2022, the entire contents of which are incorporated herein by reference.

TECHNICAL FIELD

The present disclosure relates to an indicator device, an electronic musical instrument, a light emission control method and a storage medium.

DESCRIPTION OF RELATED ART

There has been an electronic apparatus, such as an electronic musical instrument or audio equipment, provided with a display (indicator) to visualize the volume level and/or the velocity. (See, for example, JP 2004-029720 A). In the configuration disclosed in JP 2004-029720 A, the volume level and the velocity are displayed in a single display area. Hence, information on volume can be intuitively caught.

SUMMARY OF THE INVENTION

According to an aspect of the present disclosure, there is provided an indicator device including:

a plurality of light emitters; and at least one processor that

- obtains, at intervals of a first period, a first period maximum value representing a maximum volume among a plurality of pieces of volume information based on an input signal,
- obtains, for each second period including a plurality of first periods each being the first period, a minimum value among first period maximum values each being the first period maximum value as a second period minimum value and a maximum value among the first period maximum values as a second period maximum value, and
- controls light emission of the light emitters based on a relative ratio of a predetermined first period maximum value among the first period maximum values, the relative ratio being based on the second period minimum value and the second period maximum value.

BRIEF DESCRIPTION OF DRAWINGS

The accompanying drawings are not intended as a definition of the limits of the present disclosure but illustrate embodiments of the present disclosure, and together with the general description given above and the detailed description of the embodiments given below, serve to explain the principles of the present disclosure, wherein.

DETAILED DESCRIPTION

Hereinafter, one or more embodiments of the present disclosure will be described with reference to the drawings. Although various limitations technically preferable for carrying out the present disclosure are put on the embodiment (s) described below, the technical scope of the present disclosure is not limited to the embodiment(s) below or illustrated examples.

[Configuration of Electronic Musical instrument 100]

Figure 1:
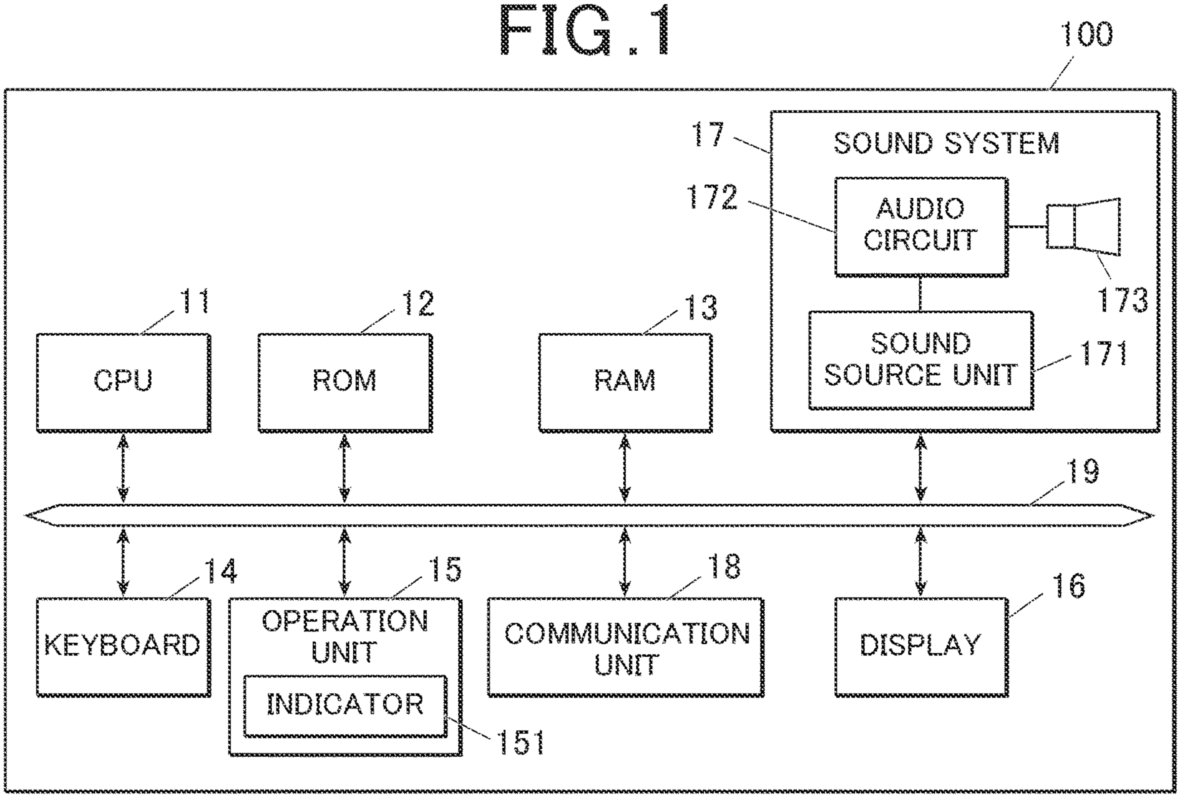
FIG. 1 is a block diagram showing a functional configuration of an electronic musical instrument including an indicator device of the present disclosure.
Figure 2:
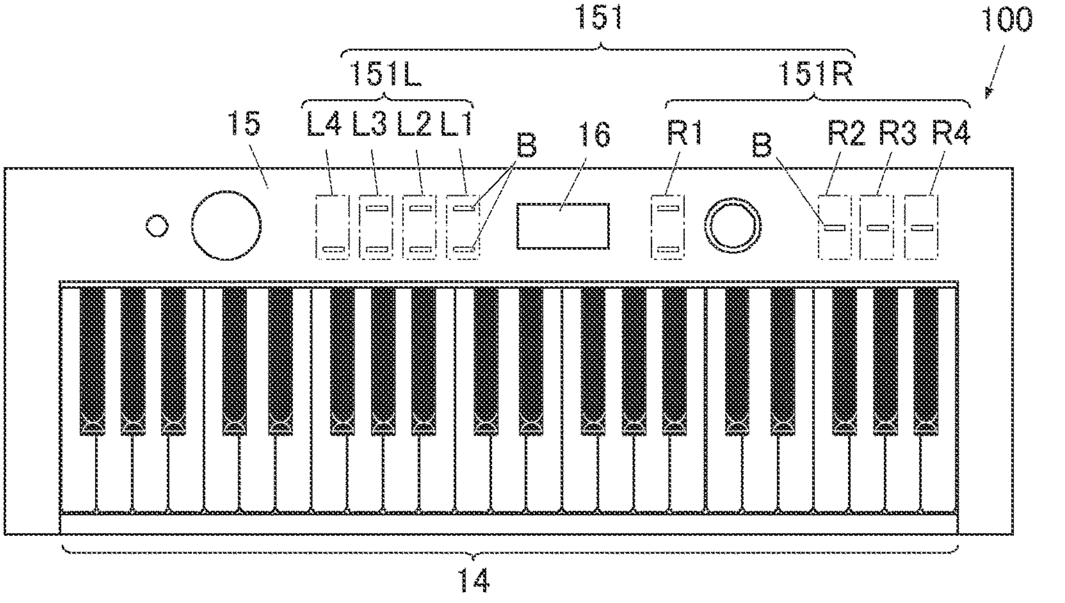
FIG. 2 shows an example of the external configuration of the electronic musical instrument including the indicator device of the present disclosure.

FIG. 1 is a block diagram showing a functional configuration of an electronic musical instrument 100 including an indicator device of the present disclosure. FIG. 2 shows an example of the external configuration of the electronic musical instrument 100.

As shown in FIG. 1 and FIG. 2, the electronic musical instrument 100 includes at least one processor, such as a central processing unit (CPU) 11, a read only memory (ROM) 12, a random access memory (RAM) 13, a keyboard 14, an operation unit 15, a display 16, a sound system 17, and a communication unit 18. These components are connected to one another via a bus 19.

The CPU 11 reads programs and data stored in the ROM 12 to perform various processes using the RAM 13 as a work area, thereby performing centralized control of the components of the electronic musical instrument 100. For example, the CPU 11 causes the sound system 17 to output musical sound, such as sound of a piano, according to the pitch of each pressed key of the keyboard 14 or causes the sound system 17 to output a piece of music selected using the operation unit 15. Further, the CPU 11 causes the sound system 17 to play music based on audio data (sound source data) that is an input signal(s) input from an external device via the communication unit 18, and also performs a light emission control process described below, thereby controlling light emission of an indicator 151 of the operation unit 15 according to the volume level (volume information) based on the input signal.

The ROM 12 stores programs, various data and so forth.

The RAM 13 provides a working memory space for the CPU 11 and stores temporary data.

The keyboard 14 includes a plurality of keys and outputs information on pressed/unpressed keys to the CPU 11.

The operation unit 15 includes tap-type operation elements that detect a finger of a user on the basis of change in capacitance, and outputs, to the CPU 11, operation signals corresponding to tap operations made by the user. The operation unit 15 may include various switches and/or operation buttons that are physically pressed with a finger of the user or the like.

In this embodiment, the operation unit 15 not only receives tap operations or the like made by the user as an operation receiver, but also functions as an indicator by having the indicator 151. As shown in FIG. 2, the indicator 151 includes an indicator 151L on the left of the display 16 and an indicator 151R on the right of the display 16. There is a case where audio data (input signal) input into the sound system 17 is audio data of a stereo sound source including audio data of the left sound source (left channel) as a first input signal(s) and audio data of the right sound source (right channel) as a second input signal(s). In this case, the indicator 151L indicates the volume level of the left sound source using light emitters L1-L4, and the indicator 151R indicates the volume level of the right sound source using light emitters R1-R4.

The light emitters L1, L2, L3, L4, R1, R2, R3, R4 each include one or more light emitting diodes (LEDs). Light emission areas of the LEDs of the light emitters adjacent to one another are discontinuous with one another. That is, the light emission areas of the LEDs of the light emitters adjacent to one another are not linked with one another. The light emitters L1, L2, L3, L4, R1, R2, R3, R4 each include one or more tap-type operation buttons B. In response to an operation on any of the operation buttons B, an operation signal corresponding to the operated operation button B is output to the CPU 11.

The indicator 151 of this embodiment is controlled by the CPU 11 performing light emission control such that the number of lighting emitters to emit light (i.e., light up), which may be hereinafter simply referred to as "lighting emitters", among the light emitters L1-L4 of the indicator 151L changes according to the moving average value of values of the relative ratio of the volume level of the left sound source of the audio data (detailed below). That is, the indicator 151 (151L) is controlled such that the larger the moving average value of the relative ratio of the volume level of the left sound source is, the larger the number of lighting emitters is. More specifically, the light emitters L1, L2, L3, L4 of the indicator 151L are disposed side by side in this order from the display 16 leftward, and controlled such that the light emitter L1 lights up if the number of lighting emitters (the number of lighting lines or the number of lighting groups) is 1, the light emitters L1-L2 light up if the number of lighting emitters is 2, the light emitters L1-L3 light up if the number of lighting emitters is 3, and the light emitters L1-L4 light up if the number of lighting emitters is 4. That is, the indicator 151L is controlled such that the number of lighting emitters increases to the left as the moving average value of the relative ratio of the volume level of the left sound source of the audio data increases.

Similarly, the indicator 151 of this embodiment is controlled by the CPU 11 performing light emission control such that the number of lighting emitters among the light emitters R1-R4 of the indicator 151R changes according to the moving average value of values of the relative ratio of the volume level of the right sound source of the audio data (detailed below). That is, the indicator 151 (151R) is controlled such that the larger the moving average value of the relative ratio of the volume level of the right sound source is, the larger the number of lighting emitters is. More specifically, the light emitters R1, R2, R3, R4 of the indicator 151R are disposed side by side in this order from the display 16 rightward, and controlled such that the light emitter R1 lights up if the number of lighting emitters (the number of lighting lines or the number of lighting groups) is 1, the light emitters R1-R2 light up if the number of lighting emitters is 2, the light emitters R1-R3 light up if the number of lighting emitters is 3, and the light emitters R1-R4 light up if the number of lighting emitters is 4. That is, the indicator 151R is controlled such that the number of lighting emitters increase to the right as the moving average value of the relative ratio of the volume level of the right sound source of the audio data increases.

The indicator 151 and the CPU 11 constitute the indicator device of the present disclosure.

The display 16 is constituted of a liquid crystal display (LCD) or the like and performs display in accordance with instructions of display signals input from the CPU 11.

The sound system 17 includes a sound source unit 171, an audio circuit 172 and a speaker 173.

The sound source unit 171 reads waveform data (audio data) stored in advance in the ROM 12 or generates waveform data, and outputs same to the audio circuit 172, in accordance with control instructions from the CPU 11.

The audio circuit 172 converts digital waveform data (audio data) output from the sound source unit 171 into analog data and amplifies same. The speaker 173 outputs the amplified analog sound. The speaker 173 includes a left speaker and a right speaker (both not shown) respectively disposed on the left side and the right side of the electronic musical instrument 100. The left speaker outputs sound signals based on the left sound source of the audio data, and the right speaker outputs sound signals based on the right sound source of the audio data. In the case of monaural audio data, the left speaker and the right speaker output (the same) sound signals based on the audio data.

The communication unit 18 transmits and receives data, such as audio data, to and from an external device(s), such as an external terminal or an external storage medium exemplified by a USB drive, connected via a communication network, such as the Internet, Bluetooth®, or a communication interface, such as a universal serial bus (USB) cable.

[Lighting Operation of Indicator 151]

Next, lighting operation of the indicator 151 in the electronic musical instrument 100 will be described.

When receiving audio data input via the communication unit 18, the CPU 11 causes the sound system 17 to play music based on the audio data (input signal), and also controls light emission of the indicator 151 on the basis of the volume level of the audio data, thereby changing optical presentation (lighting) of the indicator 151 according to the volume level of the music (sound) being played.

As described above, since the indicator 151 of this embodiment doubles as an operation receiver (operation elements), the number of light emitters usable for indicating the volume level of the input signal is limited to the number of operation elements. For example, in this embodiment, the number of light emitters usable therefor is limited to four (four lines/groups) in each of the left indicator 151L and the right indicator 151R. Since values of or change in the volume level of the input signal is not always the same, the following problems (1) and (2) may arise if a simple method of obtaining the volume level based on the input signal at every predetermined period and lighting up the number of light emitters proportional to the volume level is used.

(1) In the case of a quiet piece of music as a whole, only a small number of light emitters light up all the time, whereas in the case of a loud piece of music as a whole, almost all light emitters light up all the time. That is, change in lighting hardly occurs.

(2) The following trade-offs occur: in the case where a period to obtain the volume level is long, flickering is prevented from occurring but music following decreases, whereas in the case where the period is short, music following is excellent, but flickering occurs.

To deal with these problems, the CPU 11 performs the light emission control process (shown in FIG. 3) described below on the basis of audio data of a piece of music to be played by the sound system 17, so that change in volume of the piece of music can be appropriately reflected in the luminous state of the light emitters of the indicator 151 regardless of the overall volume of the piece of music to be played, and the indicator 151 can smoothly indicate the volume level without decrease in music following and occurrence of flickering.

Figure 3:
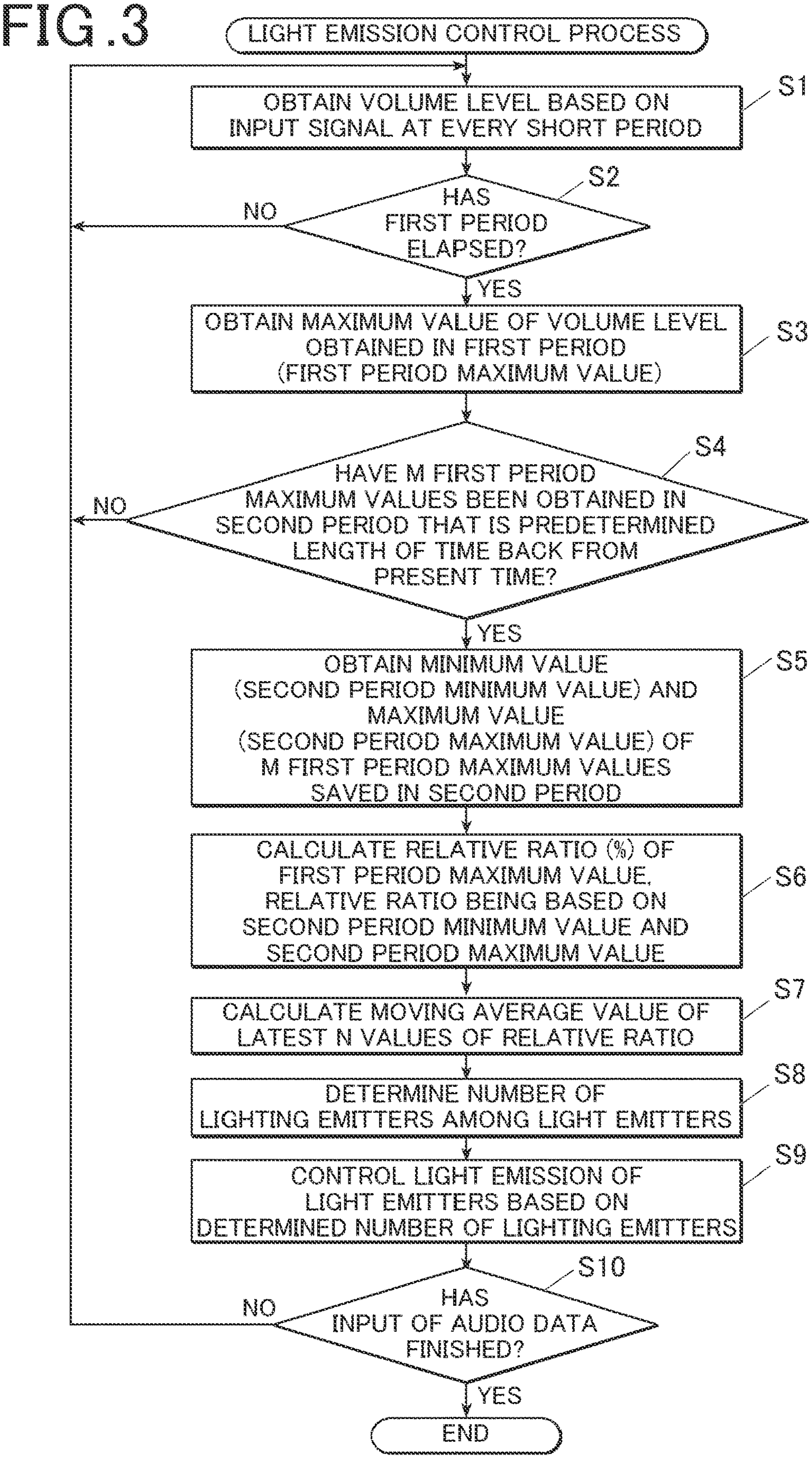
FIG. 3 is a flowchart of a light emission control process that is performed by a CPU shown in FIG. 1.

FIG. 3 is a flowchart of the light emission control process that is performed by the CPU 11. The light emission control process is performed by the CPU 11 and the program(s) stored in the ROM 12 working together when audio data of a piece of music to be played by the sound system 17 starts to be input via the communication unit 18. The CPU 11 performs the light emission control process shown in FIG. 3 with the left sound source of the audio data as the input signal and also performs same with the right sound source of the audio data as the input signal separately but substantially at the same time.

First, the CPU 11 obtains, at every short period (e.g., every 1 ms), a volume level (signal level: dimensionless quantity) based on the real-time input signal (audio data) input via the communication unit 18 (Step S1).

Next, the CPU 11 determines whether a first period T1 (e.g., about 30 ms) has elapsed since the start of obtainment of the volume level (Step S2).

If the CPU 11 determines that the first period T1 has not elapsed yet (Step S2; NO), the CPU 11 returns to Step S1 to repeat Steps S1-S2.

If the CPU 11 determines that the first period T1 has elapsed (Step S2; YES), the CPU 11 obtains the maximum value of volume levels obtained in the first period T1 (first period maximum value) and temporarily saves same in the RAM 13 (Step S3). The maximum value is obtained in order that a momentary increase in volume level due to a beat of a drum or the like is reflected in light emission of the light emitters. If, instead of the maximum value, the average value thereof is obtained, it means that the volume levels are leveled, so that there is little difference between the below-described second period maximum value and second period minimum value, and accordingly change in the number of lighting emitters hardly occurs.

Next, the CPU 11 determines whether M first period maximum values have been obtained in a second period T2, where M is a natural number (e.g., eight) and the second period T2 is a predetermined length of time (e.g., 30 ms×8 cycles=240 ms) back from the present time (Step S4).

If the CPU 11 determines that M first period maximum values have not been obtained in the second period T2, which is the predetermined length of time back from the present time (Step S4; NO), the CPU 11 returns to Step S1 to repeat Steps S1-S4.

If the CPU 11 determines that M first period maximum values have been obtained in the second period T2, which is the predetermined length of time back from the present time (Step S4; YES), the CPU 11 obtains the minimum value (second period minimum value) and the maximum value (second period maximum value) of the M first period maximum values obtained in the second period T2, which is the predetermined length of time back from the present time (Step S5).

Next, the CPU 11 calculates the relative ratio (%) of the first period maximum value, the relative ratio being based on the second period minimum value and the second period maximum value (Step S6).

The relative ratio (%) can be calculated, for example, by the following Equation 1.

Relative Ratio=(First Period Maximum Value−Second Period Minimum Value)/(Second Period Maximum Value−Second Period Minimum Value) <Equation 1>

The first period maximum value in Equation 1 is the latest (i.e., the current or last) first period maximum value among the first period maximum values obtained in the second period T2, which is the predetermined length of time back from the present time. For example, if the second period maximum value is 40, the second period minimum value is 10, and the first period maximum value is 30, the relative ratio is 0.67 (67%). That is, the scale (range) of volume levels used for controlling lighting (light emission) of the light emitters is determined by this Equation 1, and hence change in the luminous state of the light emitters is likely to occur (optical movement is likely to occur) regardless of the overall volume level of the audio data. Therefore, the problem (1), namely, in the case of a quiet piece of music as a whole, only a small number of light emitters light up all the time, whereas in the case of a loud piece of music as a whole, almost all light emitters light up all the time, hardly arises.

Next, the CPU 11 obtains the latest N values of the relative ratio (which may be hereinafter referred to as "N relative ratios") from the present time going back to the past, where N is a natural number (e.g., four), and calculates the moving average value of the N relative ratios (Step S7).

If N relative ratios are not ready (have not been obtained) yet because it is the beginning of the light emission control process or the like, the CPU 11 calculates the moving average value with an unobtainable relative ratio as "0". Use of the moving average value to determine the number of lighting emitters (described below) enables the light emitters to light up so as to smoothly follow (be in sync with) the volume level that fluctuates all the time.

The CPU 11 then determines the number of lighting emitters among the light emitters L1-L4 of the indicator 151L or the number of lighting emitters among the light emitters R1-R4 of the indicator 151R by comparing the calculated moving average value of the N relative ratios with predetermined threshold values (Step S8).

The CPU 11 determines the number of lighting emitters among the light emitters L1-L4 in Step S8 of the light emission control process in which the left sound source of the audio data is the input signal, whereas the CPU 11 determines the number of lighting emitters among the light emitters R1-R4 in Step S8 of the light emission control process in which the right sound source of the audio data is the input signal.

For example, on the basis of the comparison of the moving average value of the N relative ratios with predetermined threshold values, the CPU 11 determines the number of lighting emitters, to be more specific, determines the number of lighting emitters among the light emitters L1-L4 in the light emission control process in which the left sound source is the input signal or determines the number of lighting emitters among the light emitters R1-R4 in the light emission control process in which the right sound source is the input signal, as follows. In the following, δ represents a threshold value for determining whether the number of lighting emitters is set to "0".

- Moving average value of N relative ratios of less than δ:Number of lighting emitters of 0 (no light emitter is put in lighting, namely, light emitters L1-L4 (R1-R4) are put in no-lighting)
- Moving average value of N relative ratios of 5 or greater but less than 25%:Number of lighting emitters of 1 (light emitter L1 (R1) is put in lighting)
- Moving average value of N relative ratios of 25% or greater but less than 50%:Number of lighting emitters of 2 (light emitters L1-L2 (R1-R2) are put in lighting)

Moving average value of N relative ratios of 50% or greater but less than 75%:Number of lighting emitters of 3 (light emitters L1-L3 (R1-R3) are put in lighting)

Moving average value of N relative ratios of 75% or greater:Number of lighting emitters of 4 (light emitters L1-L4 (R1-R4) are put in lighting)

Next, the CPU 11 controls light emission of the light emitters L1-L4 or R1-R4 of the indicator 151 on the basis of the determined number of lighting emitters (Step S9).

The CPU 11 puts on or puts out each of the light emitters L1, L2, L3, L4 in Step S9 of the light emission control process in which the left sound source of the audio data is the input signal, or puts on or puts out each of the light emitters R1, R2, R3, R4 in Step S9 of the light emission control process in which the right sound source of the audio data is the input signal.

Figure 4A:
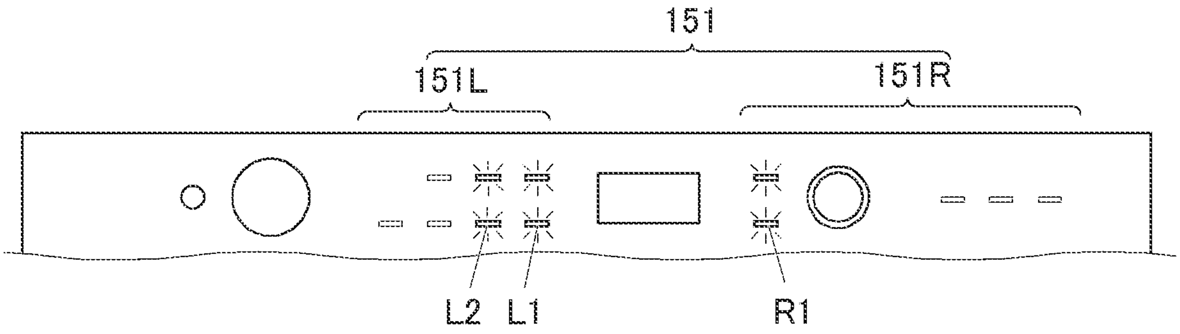
FIG. 4A shows an example of optical presentation of an indicator.

FIG. 4A shows optical presentation of the indicator 151 in a case where the number of lighting emitters among the light emitters L1-L4 is determined as "2" in the light emission control process in which the left sound source of the audio data is the input signal, and the number of lighting emitters among the light emitters R1-R4 is determined as "1" in the light emission control process in which the right sound source of the audio data is the input signal.

Figure 4B:
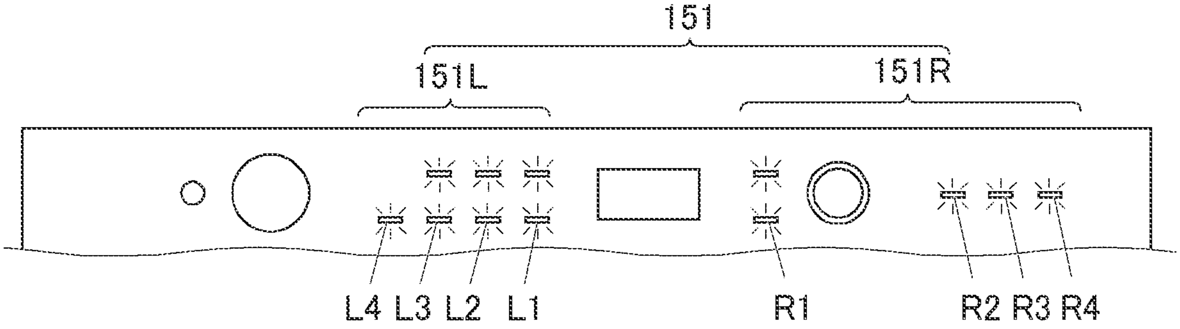
FIG. 4B shows another example of optical presentation of the indicator.

FIG. 4B shows optical presentation of the indicator 151 in a case where the number of lighting emitters among the light emitters L1-L4 is determined as "4" in the light emission control process in which the left sound source of the audio data is the input signal, and the number of lighting emitters among the light emitters R1-R4 is determined as "4" in the light emission control process in which the right sound source of the audio data is the input signal.

As shown in FIG. 4A and FIG. 4B, as the volume level (moving average value of the N relative ratios) of the left sound source of the audio data is higher, the number of lighting emitters, which emit light (light up), increases to the left, and as the volume level (moving average value of the N relative ratios) of the right sound source of the audio data is higher, the number of lighting emitters, which emit light (light up), increases to the right.

Next, the CPU 11 determines whether the input of the audio data has finished (Step S10).

If the CPU 11 determines that the input of the audio data has not finished yet (Step S10; NO), the CPU 11 returns to Step S1.

If the CPU 11 determines that the input of the audio data has finished (Step S10; YES), the CPU 11 ends the light emission control process.

In the above light emission control process, the CPU 11 calculates not the absolute value of the volume level but the relative ratio of the volume level (in this embodiment, the latest first period maximum value) of the input signal based on the second period minimum value and the second period maximum value of the volume level cyclically, and determines the number of lighting emitters on the basis of the calculated relative ratio. Hence, change in volume of a piece of music can be reflected in the luminous state of the indicator 151 regardless of whether the overall volume level of the piece of music is high or low, and the indicator 151 can perform optical presentation appropriately reflecting change in volume.

Further, not the relative ratio of the volume level of the input signal based on the second period minimum value and the second period maximum value of the volume level itself but the moving average value of a predetermined number of relative ratios (i.e., a predetermined number of values of the relative ratio) is reflected in the number of lighting emitters. Hence, both music following and flicker prevention can be achieved, and the indicator 151 can perform smooth lighting.

In order to achieve both music following and flicker prevention, it is preferable, as in this embodiment, that the moving average value of a predetermined number of relative ratios be reflected in the number of lighting emitters. However, the CPU 11 may determine the number of lighting emitters on the basis of a relative ratio (by comparing the relative ratio with the predetermined threshold values) to control light emission of the light emitters, each time the CPU 11 calculates the relative ratio.

The CPU 11 then may control the indicator 151L such that the number of lighting emitters increases to the left as the relative ratio of the volume level of the left sound source (first input signal) of the audio data increases, and control the indicator 151R such that the number of lighting emitters increases to the right as the relative ratio of the volume level of the right sound source (second input signal) of the audio data increases.

Hereinafter, modifications of the above embodiment will be described.

[First Modification]

For example, if the second period maximum value and the second period minimum value of the volume level of the left sound source of a stereo sound source are 1,000 and 0, respectively, the current volume level (in this embodiment, the latest first period maximum value) of the left sound source (first input signal) is 500, the second period maximum value and the second period minimum value of the volume level of the right sound source of the stereo sound source are 500 and 0, respectively, and the current volume level (in this embodiment, the latest first period maximum value) of the right sound source (second input signal) is 250, the relative ratios of the left sound source and the right sound source are both 50%. Hence, the number of lighting emitters among the light emitters L1-L4 and the number of lighting emitters among the light emitters R1-R4 are the same, and accordingly difference in volume level between the left sound source and the right sound source cannot be expressed.

It is therefore preferable to use, as the second period maximum value and the second period minimum value used for obtaining the relative ratio in Step S6 of the above light emission control process, the average value of the second period maximum values and the average value of the second period minimum values calculated regarding the left sound source and the right sound source.

For example, if the second period maximum value and the second period minimum value of the volume level of the left sound source and the second period maximum value and the second period minimum value of the volume level of the right sound source are those mentioned above, their averaged second period maximum value and averaged second period minimum value are 750 and 0, respectively. For the volume level of the input signal of the left sound source of 500, the number of lighting emitters corresponding to the relative ratio of 2/3 (67%) lights up, whereas for the volume level of the input signal of the right sound source of 250, the number of lighting emitters corresponding to the relative ratio of 1/3 (33%) lights up. Thus, difference in volume level between the left sound source and the right sound source can be expressed.

[Second Modification]

In the above embodiment, the light emitters L1, L2, L3, L4 (light emitters R1, R2, R3, R4) each take the no-lighting state or the lighting state, but may take the no-lighting state, the half-lighting state or the lighting state. In this case, in Step S8, the CPU 11 may determine the number of lighting emitters on the basis of the moving average value of N relative ratios (or relative ratio) as follows. It is noted that the "half-lighting state" in this modification means lighting with half the luminous intensity in the "lighting state".

Moving average value of N relative ratios of less than δ:Number of lighting emitters of 0 (no light emitter is put in either half-lighting or lighting, namely, light emitters L1-L4 (R1-R4) are put in no-lighting)

Moving average value of N relative ratios of 5 or greater but less than 12.5%:Number of lighting emitters of 0.5 (light emitter L1 (R1) is put in half-lighting)

Moving average value of N relative ratios of 12.5% or greater but less than 25%:Number of lighting emitters of 1 (light emitter L1 (R1) is put in lighting)

Moving average value of N relative ratios of 25% or greater but less than 37.5%:Number of lighting emitters of 1.5 (light emitter L1 (R1) is put in lighting and light emitter L2 (R2) is put in half-lighting)

Moving average value of N relative ratios of 37.5% or greater but less than 50%:Number of lighting emitters of 2 (light emitters L1-L2 (R1-R2) are put in lighting)

Moving average value of N relative ratios of 50% or greater but less than 62.5%:Number of lighting emitters of 2.5 (light emitters L1-L2 (R1-R2) are put in lighting and light emitter L3 (R3) is put in half-lighting)

Moving average value of N relative ratios of 62.5% or greater but less than 75%:Number of lighting emitters of 3 (light emitters L1-L3 (R1-R3) are put in lighting)

Moving average value of N relative ratios of 75% or greater but less than 87.5%:Number of lighting emitters of 3.5 (light emitters L1-L3 (R1-R3) are put in lighting and light emitter L4 (R4) is put in half-lighting)

Moving average value of N relative ratios of 87.5% or greater:Number of lighting emitters of 4 (light emitters L1-L4 (R1-R4) are put in lighting)

Thus, the indicator 151 can perform optical presentation reflecting the volume level more finely.

As described above, the electronic musical instrument 100 of the above embodiment includes the indicator 151 having the light emitters (L1-L4, R1-R4) and the CPU 11 that controls the light emitters according to the volume level based on an input signal(s). The CPU 11 (*i*) obtains, at every first period (at intervals of a first period), a first period maximum value representing the maximum volume among a plurality of volume levels obtained at intervals of a short period, (ii) obtains, for each second period including a plurality of first periods each being the first period, the minimum value among first period maximum values each being the first period maximum value as a second period minimum value and the maximum value among the first period maximum values as a second period maximum value, (iii) calculates a relative ratio of a predetermined first period maximum value among the first period maximum values, the relative ratio being based on the second period minimum value and the second period maximum value, and (iv) controls light emission of the light emitters based on the calculated relative ratio.

Hence, change in volume of the input signal is reflected in the luminous state of the light emitters of the indicator 151 regardless of whether the overall volume level of the input signal is high or low, and the indicator 151 can perform optical presentation appropriately reflecting change in volume.

Further, the CPU 11 calculates the moving average value of the latest predetermined number of relative ratios, each of which is the relative ratio, each time the CPU 11 obtains the latest predetermined number of relative ratios, and controls light emission of the light emitters according to the calculated moving average value.

Hence, both input-signal following and flicker prevention can be achieved, and the light emitters can perform smooth lighting.

Further, for example, the CPU 11 determines the number of lighting emitters to emit light among the light emitters of the indicator 151 based on a comparison of the calculated moving average value with a threshold value(s).

Hence, both input-signal following and flicker prevention can be achieved, and also change in volume of a piece of music can be reflected in the luminous state of the light emitters of the indicator 151.

Further, the indicator 151 includes the indicator 151L (first group) in which light emitters for the first input signal (left sound source) are disposed side by side and the indicator 151R (second group) in which light emitters for the second input signal (right sound source) are disposed side by side, and the CPU 11 controls light emission of the light emitters such that (i) the number of lighting emitters to emit light in the indicator 151L increases in a first direction (left direction) as the moving average value based on the first input signal increases and (ii) the number of lighting emitters to emit light in the indicator 151R increases in a second direction (right direction) different from the first direction as the moving average value based on the second input signal increases. This allows the user to easily distinguish and catch the volume level of the first input signal and the volume level of the second input signal.

Further, the light emitters of the indicator 151 include a light emitter(s) for the first input signal and a light emitter(s) for the second input signal, and the CPU 11 (i) obtains (i-a) the average value (averaged second period minimum value) of the second period minimum value based on the volume level of the first input signal and the second period minimum value based on the volume level of the second input signal and (i-b) the average value (averaged second period maximum value) of the second period maximum value based on the volume level of the first input signal and the second period maximum value based on the volume level of the second input signal, (ii) calculates (ii-a) the moving average value regarding the first input signal based on the averaged second period minimum value, the averaged second period maximum value, and the predetermined first period maximum value regarding the first input signal and (ii-b) the moving average value regarding the second input signal based on the averaged second period minimum value, the averaged second period maximum value, and the predetermined first period maximum value regarding the second input signal, and (iii) controls light emission of (iii-a) the light emitter for the first input signal according to the moving average value regarding the first input signal and (iii-b) light emission of the light emitter for the second input signal according to the moving average value regarding the second input signal.

Hence, difference in volume level between multiple types of input signals (e.g., the first input signal of the left sound source and the second input signal of the right sound source of the stereo sound source) can be expressed.

Further, the light emitters of the indicator 151 are each capable of taking any one of the no-lighting state, the half-lighting state and the lighting state (switching between no-lighting, half-lighting and lighting), and the CPU 11 controls light emission of the light emitters based on the comparison of the moving average value with the threshold value such that the light emitters each take one of the no-lighting state, the half-lighting state and the lighting state (are each in the no-lighting, the half-lighting or the lighting). Hence, a limited number of light emitters can perform optical presentation reflecting the volume level more finely.

Further, the input signal is sound source data. Hence, change in volume of the input sound source data can be reflected in the luminous state of the light emitters of the indicator 151 regardless of whether the overall volume of the input sound source data is high or low, and the indicator 151 (light emitters thereof) can perform optical presentation appropriately reflecting change in volume.

Further, the indicator 151 is capable of receiving an operation(s) as an operation receiver ((part of) the operation unit 15) while the sound source data is not played. Hence, the user can make/input operations using the indicator 151, and even in a small space, indication of the volume level and arrangement of an operation receiver can be achieved.

Further, the light emitters of the indicator 151 are disposed so as to correspond to respective light emission areas that are discontinuous with one another. Hence, the volume level can be indicated to be easily caught/recognized by the user.

Those described in the above embodiment and modifications are not limitations but some of preferred examples of the indicator device, the electronic musical instrument, the light emission control method and the storage medium storing the program(s) of the present disclosure.

For example, in the above embodiment, the indicator 151 as the indicator included in the indicator device of the present disclosure is provided in the electronic musical instrument 100, but the indicator of the present disclosure may be provided not in an electronic musical instrument but in another electronic apparatus as an operation unit (operation receiver).

Further, in the above embodiment, the present disclosure is applied to the case where audio data input from an external device via the communication unit 18 is the input signal and a piece of music based on the input signal is played, and the indicator 151 indicates the volume level of the input signal. However, the input signal is not limited thereto. For example, the present disclosure may be applied to a case where audio data (recorded data, etc.) stored in the electronic musical instrument 100 (e.g., stored in the ROM 12 or the ROM 13 thereof) is read as the input signal and a piece of music based on the input signal is played, and the indicator 151 indicates the volume level of the input signal. The present disclosure may also be applied to a case where performance data, such as MIDI data, is the input signal and a piece of music based on the input signal is played, and the indicator 151 indicates the volume level of the input signal.

Further, in the above embodiment, the input signal includes multiple types of input signals (input signals of a stereo sound source), namely, the input signal of the left sound source and the input signal of the right sound source. However, the input signal is not limited thereto. For example, the input signal may be sound source data composed of input signals of multiple (instrument) parts, and the indicator 151 may have light emitters for the respective parts. The CPU 11 then may calculate the above-described relative ratio (moving average value thereof) regarding each of the input signals of the respective parts, and control light emission of the light emitters for the respective parts using their respective relative ratios (moving average values thereof). In this case, as described in the first modification, the CPU 11 may use, as the second period maximum value and the second period minimum value used for obtaining the relative ratio in Step S6 of the above light emission control process, the average value of the second period maximum values and the average value of the second period minimum values calculated based on the volume information of the multiple types of the input signals.

Further, the arrangement and the number of light emitters in the indicator described in the above embodiment are not imitations but examples.

Further, in the above embodiment, the CPU 11, which controls the entire electronic musical instrument 100, performs light emission control of the indicator 151, but the indicator 151 may be provided with a CPU(s) or a microprocessor(s) that performs the light emission control process.

Further, in the above, the computer-readable storage medium storing the program(s) of the present disclosure is a nonvolatile memory, such as a ROM, but not limited thereto and may be an HDD, an SSD or a portable recording medium, such as a CD-ROM. Further, as a medium to provide data of the program(s) of the present disclosure via a communication line, a carrier wave can be used.

The specific configuration/components of and operation related to the indicator can also be appropriately changed without departing from the scope of the present disclosure.

Although one or more embodiments or the like of the present disclosure have been described above, the technical scope of the present disclosure is not limited to the embodiments or the like described above but defined on the basis of claims stated below. The technical scope of the present disclosure includes the scope equivalent to the claims with changes irrelevant to the essence of the present disclosure made from the claims.

The invention claimed is:

1. An indicator device comprising:

a plurality of light emitters; and at least one processor that obtains, at intervals of a first period, a first period maximum value representing a maximum volume among a plurality of pieces of volume information based on an input signal, obtains, for each second period including a plurality of first periods each being the first period, a minimum value among first period maximum values each being the first period maximum value as a second period minimum value and a maximum value among the first period maximum values as a second period maximum value, and controls light emission of the light emitters based on a relative ratio of a predetermined first period maximum value among the first period maximum values, the relative ratio being based on the second period minimum value and the second period maximum value.

2. The indicator device according to claim 1, wherein the processor calculates the relative ratio based on the predetermined first period maximum value, the second period minimum value and the second period maximum value.

3. The indicator device according to claim 2, wherein the processor calculates a moving average value of a latest predetermined number of relative ratios each being the relative ratio each time the processor obtains the latest predetermined number of relative ratios, and controls the light emission of the light emitters according to the moving average value.

4. The indicator device according to claim 3, wherein the processor determines the number of lighting emitters to emit light among the light emitters based on a comparison of the moving average value with a threshold value.

5. The indicator device according to claim 4, wherein the light emitters are each capable of switching between no-lighting, half-lighting and lighting, and wherein the processor controls the light emission based on the comparison of the moving average value with the threshold value such that the light emitters are each in the no-lighting, the half-lighting or the lighting.

6. The indicator device according to claim 3, wherein the input signal includes a first input signal and a second input signal, wherein the light emitters include a first group of light emitters for the first input signal disposed side by side and a second group of light emitters for the second input signal disposed side by side, and wherein the processor controls the light emission such that (i) the number of lighting emitters to emit light in the first group increases in a first direction as the moving average value based on the first input signal increases and (ii) the number of lighting emitters to emit light in the second group increases in a second direction different from the first direction as the moving average value based on the second input signal increases.

7. The indicator device according to claim 3, wherein the input signal includes a first input signal and a second input signal, wherein the light emitters include a light emitter for the first input signal and a light emitter for the second input signal, and wherein the processor obtains (i) an averaged second period minimum value of the second period minimum value based on the volume information of the first input signal and the second period minimum value based on the volume information of the second input signal and (ii) an averaged second period maximum value of the second period maximum value based on the volume information of the first input signal and the second period maximum value based on the volume information of the second input signal, calculates (i) the moving average value regarding the first input signal based on the averaged second period minimum value, the averaged second period maximum value, and the predetermined first period maximum value regarding the first input signal and (ii) the moving average value regarding the second input signal based on the averaged second period minimum value, the averaged second period maximum value, and the predetermined first period maximum value regarding the second input signal, and controls the light emission of (i) the light emitter for the first input signal according to the moving average value regarding the first input signal and (ii) the light emission of the light emitter for the second input signal according to the moving average value regarding the second input signal.

8. The indicator device according to claim 1, wherein the input signal is sound source data, and wherein the light emitters are capable of receiving an operation as an operation receiver while the sound source data is not played.

9. The indicator device according to claim 1, wherein the light emitters are disposed so as to correspond to respective light emission areas that are discontinuous with one another.

10. An electronic musical instrument comprising the indicator device according to claim 1.

11. A light emission control method that is performed by a computer, comprising:

obtaining, at intervals of a first period, a first period maximum value representing a maximum volume among a plurality of pieces of volume information based on an input signal, obtaining, for each second period including a plurality of first periods each being the first period, a minimum value among first period maximum values each being the first period maximum value as a second period minimum value and a maximum value among the first period maximum values as a second period maximum value, and controlling light emission of a plurality of light emitters based on a relative ratio of a predetermined first period maximum value among the first period maximum values, the relative ratio being based on the second period minimum value and the second period maximum value.

12. The light emission control method according to claim 11, further comprising calculating the relative ratio based on the predetermined first period maximum value, the second period minimum value and the second period maximum value.

13. The light emission control method according to claim 12, further comprising calculating a moving average value of a latest predetermined number of relative ratios each being the relative ratio in response to obtaining, each time, the latest predetermined number of relative ratios, wherein the controlling includes controlling the light emission of the light emitters according to the moving average value.

14. The light emission control method according to claim 13, further comprising determining the number of lighting emitters to emit light among the light emitters based on a comparison of the moving average value with a threshold value.

15. The light emission control method according to claim 14, wherein the light emitters are each capable of switching between no-lighting, half-lighting and lighting, and wherein the controlling includes controlling the light emission based on the comparison of the moving average value with the threshold value such that the light emitters are each in the no-lighting, the half-lighting or the lighting.

16. The light emission control method according to claim 13, wherein the input signal includes a first input signal and a second input signal, wherein the light emitters include a first group of light emitters for the first input signal disposed side by side and a second group of light emitters for the second input signal disposed side by side, and wherein the controlling includes controlling the light emission such that (i) the number of lighting emitters to emit light in the first group increases in a first direction as the moving average value based on the first input signal increases and (ii) the number of lighting emitters to emit light in the second group increases in a second direction different from the first direction as the moving average value based on the second input signal increases.

17. The light emission control method according to claim 13, wherein the input signal includes a first input signal and a second input signal, wherein the light emitters include a light emitter for the first input signal and a light emitter for the second input signal, and wherein the obtaining of the second period minimum value and the second period maximum value includes obtaining (i) an averaged second period minimum value of the second period minimum value based on the volume information of the first input signal and the second period minimum value based on the volume information of the second input signal and (ii) an averaged second period maximum value of the second period maximum value based on the volume information of the first input signal and the second period maximum value based on the volume information of the second input signal, wherein the calculating of the movement average value includes calculating (i) the moving average value regarding the first input signal based on the averaged second period minimum value, the averaged second period maximum value, and the predetermined first period maximum value regarding the first input signal and (ii) the moving average value regarding the second input signal based on the averaged second period minimum value, the averaged second period maximum value, and the predetermined first period maximum value regarding the second input signal, and wherein the controlling includes controlling the light emission of (i) the light emitter for the first input signal according to the moving average value regarding the first input signal and (ii) the light emission of the light emitter for the second input signal according to the moving average value regarding the second input signal.

18. The light emission control method according to claim 11, wherein the input signal is sound source data, and wherein the light emitters are capable of receiving an operation as an operation receiver while the sound source data is not played.

19. The light emission control method according to claim 11, wherein the light emitters are disposed so as to correspond to respective light emission areas that are discontinuous with one another.

20. A non-transitory computer-readable storage medium storing a program that causes a computer to:

obtain, at intervals of a first period, a first period maximum value representing a maximum volume among a plurality of pieces of volume information based on an input signal, obtain, for each second period including a plurality of first periods each being the first period, a minimum value among first period maximum values each being the first period maximum value as a second period minimum value and a maximum value among the first period maximum values as a second period maximum value, and control light emission of a plurality of light emitters based on a relative ratio of a predetermined first period maximum value among the first period maximum values, the relative ratio being based on the second period minimum value and the second period maximum value.

* * * * *